Oct. 20, 1970 W. POSCHENRIEDER 3,535,457

TIME DIVISION MULTIPLEX SYSTEM PROVIDED WITH BANDWIDTH MULTIPLICATION FEATURE

Filed May 9, 1966 3 Sheets-Sheet 1

United States Patent Office 3,535,457
Patented Oct. 20, 1970

3,535,457

TIME DIVISION MULTIPLEX SYSTEM PROVIDED WITH BANDWITH MULTIPLICATION FEATURE

Werner Poschenrieder, Munich, Germany, assignor to Siemens Aktiengesellschaft, Munich, Germany
Filed May 9, 1966, Ser. No. 548,574
Claims priority, application Germany, May 19, 1965, S 97,176
Int. Cl. H04j 3/00
U.S. Cl. 179—15 10 Claims

ABSTRACT OF THE DISCLOSURE

A time multiplex communication system for wideband message channels, such as for data transmission, and for narrow band channels, such as for telephone purposes. The wideband stations are scanned a plurality of times in each scanning cycle of the narrow band stations, and interconnection between multiplex highways is made over storage devices each assigned to a message channel, with the number assigned to each channel being the same as the number of scanning samples per cycle taken in that channel. While the two terminal stations in a wideband channel must be connected to their respective multiplex highways in equally spaced time slots, intermediate segments of the channel between the terminal highways can carry the message in unequally spaced slots.

CROSS REFERENCE TO RELATED APPLICATIONS

Applicant claims priority from corresponding German application Ser. No. S97,176, filed May 19, 1965.

PRIOR ART

The need for transmission of messages of different bandwidths over the same exchange system is increasing. In other words, messages of different bandwidth requirements frequently have to be transmitted over the same channel, as in the case of transmission of telephony signals and radio signals. In the case of telephony transmission, a bandwidth of three kilocycles is generally required, but in radio transmission which has to include music transmission capability, a considerably larger bandwidth is necessary. The larger bandwidth may also be required by other types of messages, such as high speed telegraphy, television and the like.

It is of course known that telephone lines are frequently used for transmission of other types of signals, including both the above-mentioned types, and signals including data. The need for data transmission capabilities arises when the data are to be transmitted from a remote location to a central processing location. Since modern data processing apparatus operates at high speed, it is not always possible to transmit data to such a system over a message channel of only three kilocycles transmission bandwidth. If such a channel were employed, the full capacity of the data processing apparatus could not be fully utilized.

In the case of time multiplex exchange systems, the bandwidth of the message channel is determined primarily by the scanning cycle for the samples transmitted in the channel. It is generally considered that the bandwidth extends to a frequency no greater than one-half of the scanning frequency.

Of course, it would be possible to select the scanning frequency in such fashion that message channels could be established for the greatest possible bandwidth. In this case, all message channels to be transmitted over the same time multiplex exchange apparatus would be of the same bandwidth. However, the number of channels would thereby be decreased, since the width of the scanning samples is necessarily of a finite value of an irreducible minimum length. Consequently, it is more suitable to adapt the bandwidth of the message channels to the bandwidth of the message which is to be transmitted over the channel.

In this connection of adaptation of the bandwidth of the channel to the bandwidth of the message, the prior art (see for example Bergmann et al. U.S. Patent No. 3,238,305) includes a system in which the bandwidth of message channels is multiplied. In this prior art system, telephone subscriber stations are connectable to a multiplex highway over low pass filters of four kilocycles cut-off frequency, by individual switches associated with the stations. Also, subscriber stations for data traffic are connectable to intermediate registers over low pass filters of a higher cut-off frequency, such as for example, 12 kilocycles per second. These filters are connected to the individually associated registers over individually-assigned switches of a first group. The registers themselves are in turn connectable to a multiplex highway over a second group of switches which also are individually assigned to the separate data stations.

The prior art system referred to operates in such fashion that the switches of the first group of switches are so actuated as to withdraw from the data stations equally spaced scanning samples of data, and then they convey those samples to the individually-associated intermediate registers. The scanning samples are then conveyed to the multiplex highway during idle time intervals or slots, through operation of the second group of switches. Also, during the same time span they are conveyed to a second multiplex highway from which they are transmitted to the receiving data stations over similar sets of switches and intermediate registers. In such fashion the scanning samples are again temporarily registered and are once more transmitted, in equally spaced form, through the low pass filter of the data receiving station, to the station itself.

With this system of the prior art, two individual groups of switches and one individual group of intermediate registers must be provided for each subscriber station. Since the number of subscriber stations is very large in a system of this type, as compared with other systems, the number of intermediate registers required for this system is also very large.

OBJECTS OF THE INVENTION

It is an object of the present invention to provide for multiplication of bandwidth in a time division multiplex system without employment of the extreme number of intermediate registers required by the prior art system.

It is a further object of the present invention to eliminate one group of switches for each subscriber station, as compared with the system of the prior art.

It is also an object of the present invention to provide for transmission of low bandwidth signals and high bandwidth signals over the same channel by bandwidth multiplication techniques involving scanning of the subscriber stations at different frequencies, depending upon the bandwidth requirement, without undue use of intermediate registers or connecting switches.

GENERAL DESCRIPTION

In the system of the present invention, the high bandwidth information source whose output is to be transmitted over the time multiplex system is scanned by a plurality of equally-spaced scanning pulses within each scanning cycle of the single bandwidth channels. That is, for data and other high bandwidth requirement signals, the scanning frequency is a multiple of the scanning frequency for low bandwidth requirement signals, such as telephony signals.

The method of the present invention is particularly characterized by the fact that intermediate registers for the scanning samples are assigned to the message channels of multiplied bandwidth, rather than to the stations which emit signals of such a bandwidth. These intermediate registers temporarily register the samples only until they can be conveyed to the following path segment during time slots which are available for such conveyance. Moreover, the time delay between the storage and the transmission forward of the scanning samples lasts only until the scanning samples pertaining to the same message channel can be conveyed in equally time spaced fashion to the last path segment of the transmission path.

In contrast to the previously known system, the intermediate registers are not individually assigned to subscriber stations, but rather are assigned to message channels which are of course established only during the duration of a connection. Since the number of message channels is smaller than the number of subscriber stations, a considerable saving in intermediate register result. Moreover, in certain special cases the number of intermediate registers can be further decreased. In addition, it is also possible to employ the intermediate registers for other purposes.

If a coupling arrangement between the transmitting and receiving station is selected, which arrangement employs several multiplex highways, and thereby several path segments, more advantages of the present invention result. That is, since in accordance with the method of the present invention, the scanning samples can be time displaced with the aid of intermediate registers, on each of the path segments of the coupling apparatus, it is not necessary to convey onward the scanning samples provided for the first path segment during the same time period over all path segments of the coupling arrangement. This of course is in contrast to the method of the prior art indicated above. Consequently, with the method of the present invention, no interruption results in the case that the identical time slots are not available for all path segments of the coupling apparatus. That is, no special devices are required in order to make available the same time slots for all path segments of the coupling apparatus in order to avoid blocking or interruption, so that such special devices need not provide for shifting of time intervals or slots which have already been seized. As a consequence, the adaptability of the present system is considerably greater in the respect of the seizure of time slots for the individual path segments of the coupling apparatus, and the same amount of traffic can also be processed with fewer instances of inability to complete connections.

The embodiments of the method of the invention are concerned with application of the method to special coupling apparatus. Consequently, further advantages of the invention will become apparent by explanation in connection with the description of such coupling apparatus. In the following, the method of the invention will be explained in detail with the aid of several drawings.

DESCRIPTION OF THE INVENTION

Figure 1:
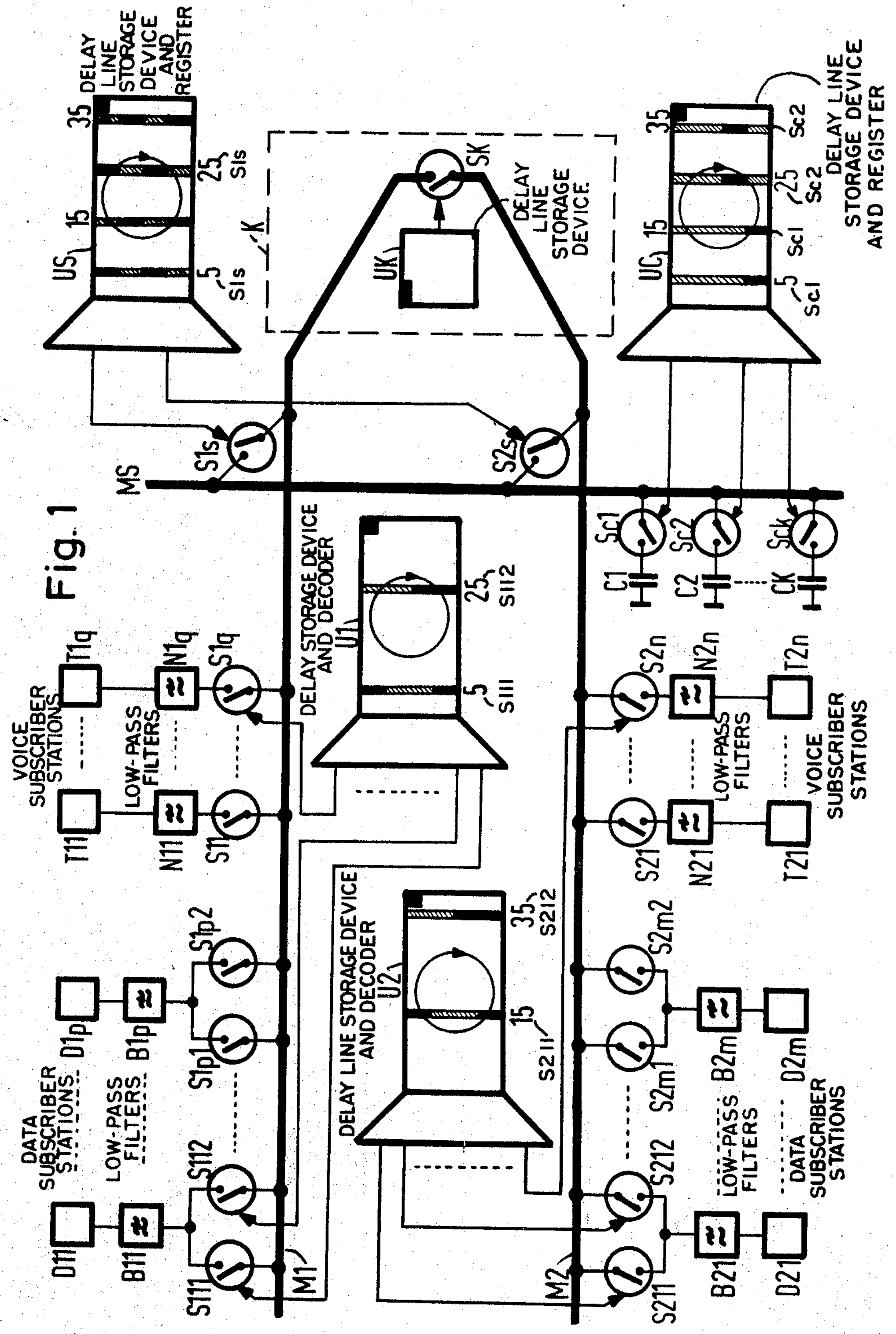
FIG. 1 is a diagrammatic view of a circuit arrangement operable to carry out the method of the invention in a two-stage time multiplex system employing two multiplex highways.

In the circuit apparatus of FIG. 1 there is shown a time multiplex exchange system provided with two time multiplex highways, M1 and M2. Subscriber stations for voice traffic, as well as subscriber stations for data traffic, are both connected to these two multiplex highways. In each case, a low pass filter is connected between the subscriber station and the highway, with at least one switch effecting the connection between the subscriber station and the highway. For instance, voice subscriber stations T11 through T1*q* are connected to highway M1 through respective low pass filters N11 through N1*q*, each by the single switch S11 through S1*q*. In contrast to talking subscriber stations, data subscriber stations are connected to the multiplex highway M1 by a pair of switches, for each data station. Thus, the data stations D11 through D1*p* are connected through respective low pass filters B11 through B1*p* by pairs of switches S111, S112 through S1*p*1, S1*p*2.

Actuation of the several switches referred to hereinabove is accomplished by the delay line storage device U1, provided with an appropriate decoder. Such a device is more fully shown, for instance, in Kneisel et al. application Ser. No. 390,026, filed Aug. 17, 1964, (now Pat. No. 3,336,741) and assigned to the assignee of the present application. A similar delay line storage device and decoder U2 is employed to actuate a similar set of switches provided for connection of a multiplex highway M2 through similar low pass filters to the same type of subscriber stations as connected to highway M1.

The highways M1 and M2 are capable of connection together by operation of a switch SK which is itself controlled by a delay line storage device UK, these two elements forming together a coupling or switching apparatus K.

Since the circuit apparatus of FIG. 1 employs two stages of switching, including as a first stage the switches which connect the subscriber stations to the respective multiplex highways, and as a second stage the switches which connect the multiplex highways together, the coupling apparatus of FIG. 1 is designated as a two-stage coupling apparatus.

The apparatus of FIG. 1 also includes an additional multiplex highway MS which is connectable to the multiplex highways M1 and M2 over respective switches S1*s* and S2*s*. A number of storage devices, shown as capacitors C1, C2 . . . CK are respectively connected to the multiplex highway MS through associated individual switches S*c*1, S*c*2 . . . S*ck*. These capacitors operate as intermediate registers for temporary storage of samples of the signals supplied from the subscriber stations.

The switches S*c*1, S*c*2 . . . S*ck* are controlled by an additional delay line storage device and register UC. Similarly, the switches S1*s* and S2*s* are controlled over a delay line storage device and register combination US, to connect the multiplex highway MS to the respective highways M1 and M2. Before the process of the invention for multiplication of the bandwidth of message channels is described, it will be suitable to direct attention briefly to the method for connection of voice subscriber stations (for instance, for telephone traffic) together over the exchange installation shown in FIG. 1, using message channels of "single" bandwidth based on sampling frequency. In such case, the two subscriber stations which are to be connected together can be those connected to the same multiplex highway, or those connected to different multiplex highways. For example, a connection can exist between subscriber station T11 and station T1*q*, which are connected to the same multiplex highway M1, or a connection may be made between subscriber station T11 and the subscriber station T21 which is connected to the other multiplex highway M2. In each case, the messages supplied between the subscriber stations are transmitted with the same frequency bandwidth. This bandwidth is determined by the scanning frequency of the time multiplex exchange and may be for example 3 or 4 kilocycles per second. In such case, the upper frequency of the low pass filters N11 . . . N1*q*, N21 . . . N2*n* will be 3 or 4 kilocycles per seconds.

If, for instance, the station T21 is to be connected with the station T11, the switch S11, the switch S21 and the switch SK must be actuated simultaneously. In such case the scanning samples taken from the subscriber station which is transmitting a message at that time will be conveyed to the other subscriber station without time displacement.

Actuation of the switches necessary to accomplish this method will be effected in known manner by the operation of delay line storage devices U1, U2 and UK. These storage devices will of course circulate the addresses of the switches to be actuated in the same time slots, and the decoders associated with the respective storage devices will actuate the switches whose addresses are at any instant provided by the storage device. As is well known, the storage devices would be so constructed that only a single address could circulate therein in any particular time slot. Consequently, the switches of two subscriber stations associated with the same multiplex highway (such as the switches S11 and S1*q*) could not be actuated simultaneously during the same time period. Therefore, in a connection between subscriber stations for telephone traffic which are associated with the same multiplex highway, the samples obtained by scanning are temporarily registered in known manner. The intermediate registers C1, C2 . . . C*k* connected to the additional multiplex highway MS are employed for this purpose.

If two subscriber stations T11 and T1*q* are connected with each other, then the switches S11 and S1*q* are actuated in different time slots to connect the stations to the multiplex highway M1. The scanning samples are then conveyed over switch S1*s* to one of the intermediate registers available in the time slot, such as for example register C1, through operation of switch Sc1. This register then would temporarily store each sample obtained from one of the two subscriber stations until the time slot assigned to the other subscriber station arrived. In such case an exchange of scanning samples between the two subscriber stations would occur at scanning frequency. The channel by which a message is conveyed between the two stations would then be of single scanning frequency bandwidth.

For the illustration just explained in which subscriber stations associated with the same multiplex highway are connected together with the air of the intermediate register, the addresses of switches S11 and S1*q* would circulate in the storage device U1 in time-spaced fashion, while the storage devices UK and UC would carry therein respectively the addresses of switches S1*s* and Sc1, respectively, with each address appearing twice during a scanning cycle so as to synchronize with the addresses of S11 and S1*q* in the storage device U1.

In summary, in the method of operation of the apparatus of FIG. 1 for connections between telephone subscribers, no intermediate register is required if the two subscribers are connected to different multiplex highways, but one intermediate register is required for each such connection if the connection involves two subscribers associated with the same multiplex highways. In this case the samples obtained by scanning of the two subscriber stations are registered in the same intermediate register.

The bandwidth multiplication method achieved with the apparatus of FIG. 1 will now be described. For this purpose within each cycle of scanning provided for message channels of the single bandwidth, several scanning samples equally spaced from each other are taken from each message to be transmitted. As shown in FIG. 1, data subscriber stations D11 . . . D1*p* and D21 . . . D2*m* are respectively connectable to the multiplex highways M1 and M2, over the respective low pass filters B11 . . . B1*p* and B21 . . . B2*m*. The switches S111, S112 through S1*p*1, S1*p*2 are employed to connect the data stations D11 . . . D1*p*, while the switches S211, S212 . . . S2*m*1, S2*m*2 are respectively associated with the data stations D21 . . . D2*m*. It will be seen therefore that each of the data stations is equipped with a pair of connecting switches. Each of these switches is operated at scanning frequency; that is, each of the switches S111, S112 etc. is operated at the same frequency as the switches S11 . . . S1*q* etc. associated with the telephone subscriber stations.

The two switches associated with each station are operated in such fashion that two scanning samples are taken from a connected station during each basis scanning cycle, they being at equal time spacing. As a result for such message channels, the scanning cycle is really half as long as in the case of telephone traffic (in which only one scanning sample is taken from a station during each cycle), so that the bandwidth of this message channel is doubled in comparison to that of the ordinary message channel. If more than two parallel-connected switches are provided for each subscriber station, the bandwidth of the message channel will be multiplied accordingly.

In the case of connections between data transmitting stations, intermediate registers are employed to temporarily register scanning samples for time-displacement, independent of whether the subscriber stations are connected to the same multiplex highway or to different multiplex highways. The method of operation of the apparatus of FIG. 1 in accordance with the invention will be described first for a connection between data subscriber stations associated with different multiplex highways. For example, a connection between subscriber station D11 and station D21, connected to the respective multiplex highways M1 and M2, will be described. It will be assumed that intermediate registers C1 and C2 will be assigned to the message channel connecting the two subscriber stations, for the duration of the connection. Necessarily also the multiplex switch SK must be operated at appropriate time slots to connect the two multiplex highways together. These multiplex highways of course represent two different path segments over which the scanning samples must be conveyed.

Scanning samples originating from data subscriber station D11 will first be conveyed in equally-spaced fashion to multiplex highway M1, serving as the first path segment. They will then be temporarily registered until they can be conveyed to multiplex highway M2, serving as the next path segment, such conveyance being during time slots which are available for transmission over that path segment. In the apparatus of FIG. 1, the multiplex highway M2 is the last path segment of the connection, considering transmission of a signal from data station D11 to data station D21. The time displacement obtained through the aid of the intermediate registers must last long enough that the scanning samples conveyed to the multiplex highway M2 can be equally spaced. Then, the scanning slots for the respective stations will be equally spaced both on the multiplex rail M1 and on the rail M2.

It is important, however, that the time slots in which the scanning samples are supplied to the multiplex highway M1 not be required to be the same as the time slots at which they are conveyed to the multiplex highway M2. This is for the reason that it will only be in exceptional cases that the scanning slots available for the two multiplex highways are identical. In contrast, in the known method for multiplication of the bandwidth in a time multiplex system of this type, the scanning samples are conveyed over all of the path segments of the coupling apparatus during the same time slots. Therefore, it is required in such known system that the same set of time slots be available in each path segment, and this of course considerably restricts the amount of traffic which can be handled by such a system.

Figure 3:
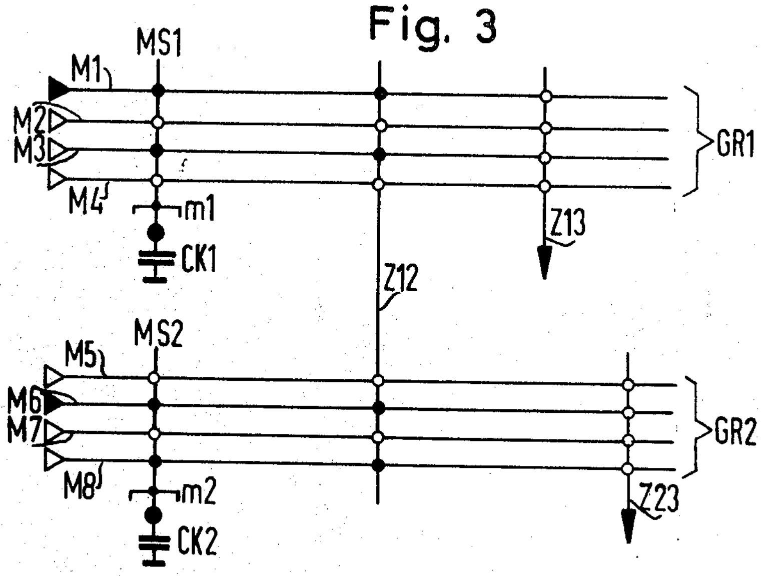
FIG. 3 is a diagrammatic showing of an embodiment of the invention operable to carry out a three-stage multiplex exchange process.

When highway MS is not employed, the circuit apparatus of FIG. 1 employs a coupling apparatus consisting only of two path segments, namely highways M1 and M2. An example of a coupling apparatus consisting of three path segments (so that the next segment following the first one, and the last segment, are not the same), is shown in FIG. 3. In the apparatus of FIG. 3 the scanning samples are first temporarily registered for time displacement until they may be conveyed to the next path segment. However, they need not be conveyed to the next path segment during equally time spaced slots. The samples conveyed from the next path segment are again temporarily stored for transmission to the last path segment when equally spaced slots are available for that segment. It is to be particularly noted that only the scanning samples which are conveyed to the last path segment need be equally time spaced, and that the scanning samples conveyed to the intermediate segment need not be equally spaced. As a result, there are more possible free time slots into which scanning samples can be placed for conveyance to the intermediate multiplex highway.

The manner in which the time displacement takes place through use of temporary registration will be explained in connection with a particular example thereof, with reference to FIG. 1. In this example it shall be assumed that the cycle of the scanning samples is divided into 40 periodically recurring time slots. The scanning samples will be assumed to be taken from the subscriber station D11 during the 5th and 25th time slots. For this purpose the address of switch S111 will circulate in delay line storage device U1 during the 5th time slot, and the address of switch S112 will circulate in the same storage device in the 25th time slot, as is indicated by appropriately designated transverse lines in the storage device of FIG. 1. The switches are therefore actuated during the corresponding time slots and signal samples are taken from the data station D11 during those time slots. These scanning samples are equally time spaced since the time interval between the 5th slot and the 25th slot is equal to the time interval between the 25th slot and the following 5th slot.

It will be assumed that the intermediate registers C1 and C2 are assigned to this multiple bandwidth message channel for storing the scanned samples. Those samples are thereby conveyed from multiplex highway M1 over switch S1*s* to the multiplex highway MS, and by switches S*c*1 and S*c*2 to the respective intermediate registers C1 and C2. This will be assumed to be done in such fashion that the scanning samples withdrawn from the source D11 during the 5th time slot is conveyed to the intermediate register C1, while the scanning sample withdrawn during the 25th time slot will be directed to the intermediate register C2. For this purpose the delay line storage device US will circulate during the 5th and 25th time slots the addresses of switch S1*s*, while the delay line storage device UC will circulate during the 5th time slot the address of switch S*c*1 and during the 25th time slot the address of switch S*c*2. This of course is also indicated by appropriately designated transverse lines in the individual delay line storage devices referred to.

In the example under consideration, it will be assumed that the 15th and the 35th time slots are available for multiplex highway M2. These slots will then be seized for transmission of the signal samples, and the intermediate registers C1 and C2 will retain the stored samples until they can be conveyed to the multiplex highway M2 during the respective 15th and 35th time slots. It will be assumed that the sample withdrawn during the 5th time slot is to be conveyed to the highway M2 during the 15th slot of the highway, and the sample withdrawn during the 25th time slot of highway M1 will be directed to highway M2 during the 35th time slot. For this purpose the address of switch S*c*1 will circulate in the storage device UC during the 15th time slot and the address of switch S*c*2 will circulate in the same device during the 35th time slot. Also, the address of switch SZS will circulate in storage device US in the 15th and 35th slots. As a consequence, the scanning sample stored in intermediate register C1 will be conveyed to the multiplex highway M2 during the 15th time slot, and the scanning sample temporarily registered in the register C2 will be conveyed to the same highway during the 35th time slot.

In accordance with the same example, assuming a connection between the data station D11 and the data station D21, the delay line storage device U2 will circulate the address of switch S211 during the 15th time slot and the address of switch S212 during the 35th time slot. In such fashion, the scanning samples conveyed to the multiplex highway M2 are forwarded by that highway to the subscriber station D21. In this fashion, a message channel of double band width (that is, twice the bandwidth established by the basic scanning frequency) will be established between the data stations. This channel of course is capable of transmitting messages in two directions, that is, scanning samples may be withdrawn from the data station D21 during the 15th time slot and registered in the intermediate register C1 until the 5th time slot of the following scanning cycle, and the scanning cycle withdrawn from station B21 during the 35th time slot will be temporarily registered in register C2 until the succeeding 25th time slot. The two scanning samples will then be conveyed during two equally time spaced slots to multiplex highway M1 and thereby to subscriber station D11.

It will be appreciated that two-way traffic is possible and that scanning samples which overlap will remain unaltered if the intermediate register is linear.

In the foregoing, the description of operation of the system for double bandwidth-message channels has been described. If a message channel of greater bandwidth is required, then the number of switches effecting the time multiplex connections may be increased for each subscriber station, as has already been explained. A larger number of intermedaite registers corresponding to the increased number of switches must also be provided in such case. In addition, the properties of the low pass filters assigned to the subscriber stations of course must be selected in accordance with the bandwidth of the message channels.

In the above description the method of the invention employing a two-stage time multiplex apparatus with two multiplex highways has been described in conjunction with FIG. 1 (ignoring the register highway MS). Now, with the aid of FIGS. 2 and 4, the operation of the method of the invention in a two-stage time multiplex exchange which has more than two multiplex highways will be described.

Figure 2:
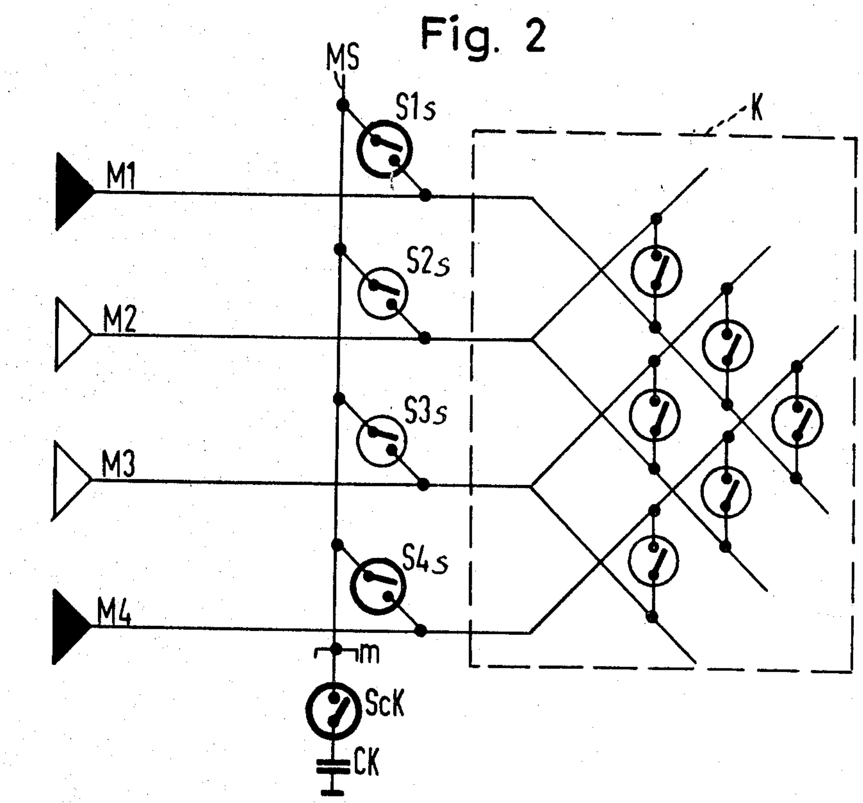
FIG. 2 is a diagrammatic showing of a circuit apparatus of a two-stage time multiplex system employing more than two multiplex highways.

FIG. 2 shows a simplified representation of a time multiplex exchange apparatus having four multiplex highways, M1 . . . M4. It will be understood that subscriber stations for telephone traffic and subscriber stations for data traffic would be connected to each one of the multiplex highways M in FIG. 2, though these stations are not shown, for simplicity's sake. In fact, the triangular emblem at the left of FIG. 2 for each multiplex rail is intended to indicate that a number of stations are connectable by the highway to other apparatus.

As in the case of FIG. 1, intermedaite registers are provided so that scanning samples may be registered therein. These intermediate registers are connectable to an additional multiplex highway MS, and the highway itself is connectable to each of the highway M1 . . . M4 by switches S1*s*, S2*s*, S3*s*, S4*s*. Only a single intermediate register CK is shown in FIG. 2, and this register is shown as connectable to the multiplex highway MS by switch S*c*K. It will be understood, however, that a number of registers would be similarly connectable to the highway MS, as indicated by the multiple symbol adjacent the letter *m* in FIG. 2. Multiplex highways M1 . . . M4 may be connected with each other by switches which are shown within the coupling or switching apparatus K.

Figure 4:
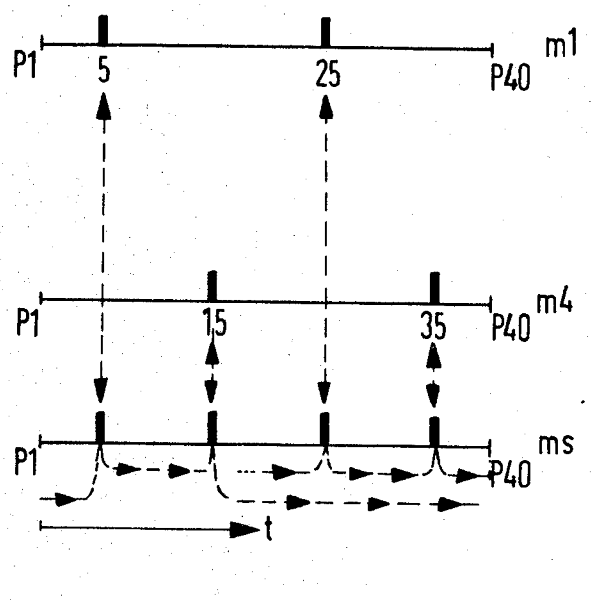
FIG. 4 is a time diagram representing the time displacement of scanning or sample pulses as would occur, for example, in the time multiplex apparatus of FIG. 2.

With the aid of FIG. 4 it will now be explained how a message channel of multiplied bandwidth may be established in accordance with the invention between subscriber stations which are connected to different multiplex highway such as the highway M1 and M4. As indicated by the time diagram of FIG. 4, this will take place in a manner analogous to that already described in conjunction with FIG. 1. Scanning samples will be taken from the subscriber station connected to the highway M1, for example during the 5th and 25th time slots, as shown on the line *m*1 in FIG. 4. These scanning samples will be conveyed to the additional multiplex highway MS over which S1*s* and delivered therefrom to two different intermediate registers. During the 15th and 35th time slots these stored samples will be retrieved from the registers and conveyed again to the multiplex highway MS. The seizure of the highway MS by scanning samples is shown on line *m*4 of FIG. 4. As is indicated in FIG. 4, the message channels so established can be utilized for transmission in two directions, since in this connection there exist the same conditions as in the methods of operation previously described. A method of operation wherein the subscriber stations which are to be connected together are themselves associated with the same multiplex highway will be described hereinafter.

The application of the method of the invention will now be described in a circuit apparatus wherein additional advantages arise. This apparatus is shown in FIG. 3 and employs a three-stage multiplex exchange apparatus. In this system the subscriber stations are connected to multiplex haighways which are associated together in groups. Two groups are specifically shown in FIG. 3 and are identified as GR1 and GR2. As shown, multiplex highways M1 . . . M4 are associated with group GR1 while multiplex highway M5 . . . M8 are associated with group GR2. The multiplex highways of different groups are connectable together by multiplex highways which act as intermediate lines. Thus, the multiplex highways of group GR1 are connectable with the highways of group GR2 by the intermediate highway Z12. In addition, the multiplex highways of both groups GR1 and GR2 are also connectable with the multiplex highways of additional groups, not shown, by highways Z13 and Z23, these again acting as intermediate lines. Consequently, in contrast to FIG. 2 wherein the individual subscriber stations are connectable with each other over two stages of switches, in the circuit apparatus of FIG. 3, there is an additional coupling stage which is formed by the multiplex highways which act as intermediate lines. Therefore, the coupling apparatus of FIG. 3 may be termed a three-stage coupling apparatus.

The apparatus of FIG. 3 of course includes intermediate registers, such as those shown for example at CK1 and CK2 and indicated as being single registers of groups of registers respectively associated with register multiplex (or "additional") highways MS1 and MS2, respectively. Appropriate switches indicated only by circular symbols are provided to connect the indivdual switches to the associated multiplex highways.

In the apparatus of FIG. 3, the scanning samples from subscriber stations in channels of multiplied bandwidth are conveyed in defferent ways, depending upon whether the stations are connected to the same multiplex highway, to multiplex highways of the same group, or to multiplex highways of different groups. The application of the method according to the invention in the case where the subscriber stations for data traffic are connected to the same highway will be described later with the aid of FIGS. 1, 2 and 3. If the subscriber stations are connected to multiplex highways of the same group, conveying of the scanning samples takes place in the same manner described previously in conjunction with FIGS. 1 and 2. That is, each scanning sample is temporarily registered by a single intermediate register.

The operation of the method of the invention for the circuit apparatus of FIG. 3 in the case of connections between subscriber stations associated wtih multiplex highways of different groups will now be described, with the aid of the time diagram of FIG. 5. In this connection, it will be assumed that a message channel of multiplied bandwidth is to be established between subscriber stations respectively connected to multiplex highways M1 and M6. For clarity of description, all multiplex highways and switches of FIG. 3 which participate in the connection are emphasized by filling in the appropriate symbols associated therewith.

It will be assumed that scanning samples are taken from the data station connected to multiplex highway M1 during the 5th and 25th time slots, as assumed in connection with previous descriptions. It will be assumed that the scanning samples are conveyed to the last path segment (here the multiplex highway M6) during the 15th and 35th time slots, also as previously assumed. However, in order that further advantages of the process of the invention can be illustrated, it will be assumed that none of these particular time slots are available for the multiplex highway Z12, which acts as an intermediate line. It will be further assumed that no time slots which are equally spaced from each other are available for this intermediate highway Z12. Rather, it will be assumed that the scanning samples arriving on the first path segment of the circuit apparatus during the equally spaced 5th and 25th time slots may be conveyed to the intermediate multiplex highway Z12 during the 13th and 27th time slots, these slots being available for seizure at the time the connection is made. The samples would then be conveyed to the last path segment during the equally-spaced 15th and 35th time slots.

These assumptions necessitate that intermediate registers be assigned for the duration of a connection to temporarily register withdrawn scanning samples for time displacement to other time slots when they may be conveyed to the next path segment during slots available for seizure in that path segment. Also, the time displacement must last long enough that scanning samples conveyed to the last path segment pertaining to the same message channel are equally time spaced. This can be provided in a fashion now to be described.

The scanning samples conveyed to the multiplex highway M1 during the 5th and 25th time slos can be conveyed to intermediate registers, such as register C*k*1, over multiplex highway MS1. During the 13th and 27th time slots, these scanning samples can be retrieved from the registers and conveyed to the additional multiplex highway Z12, acting as an intermediate line, over the multiplex highway MS1 and any one of the multiplex highways M1 . . . M4, such as for example highway M3. Then from the highway Z12 the scanning samples may be conveyed to another group of intermediate registers, such as the register C*k*2, over any one of the multiplex highways M5 . . . M8, and the multiplex highway MS2. The scanning samples are finally retrieved from the registers such as C*k*2 during the 15th and 35th time slots and conveyed over the multiplex rail MS2 and rail M6 to the subscriber station connected to the rail during those time slots. Thus, in this connection between subscriber stations connected to multiplex highways of different groups, temporary storage is effected by use of two different intermediate registers or sets of intermediate registers.

In the event that the same identical time slots are available on two path segments, it will obviously be possible to effect temporary registration through use of only one intermediate register or set of registers. For example, if the 15th and 35th time slots are available for multiplex highway Z12, only a single set of registers is necessary, these being the registers connected to the rail MS1.

Figure 5:
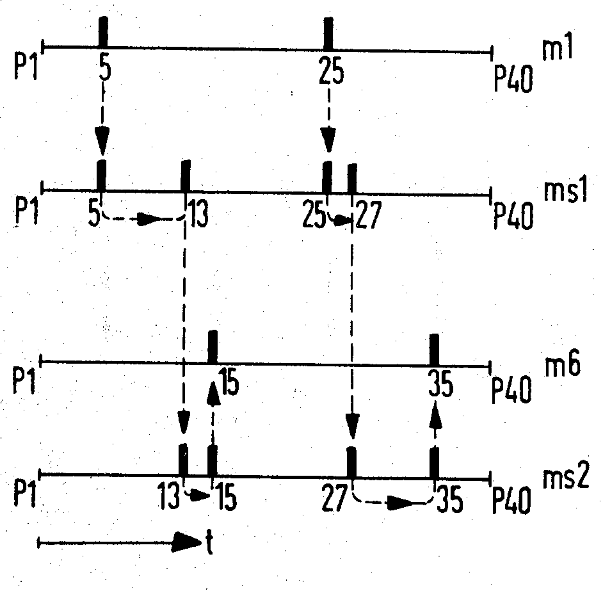
FIG. 5 is a time diagram representing the time displacement of the sample pulses which would be found, for example, in the time multiplex apparatus of FIG. 3.

The seizure of individual multiplex highways by scanning samples is shown in FIG. 5 in similar fashion to the showing in FIG. 4. Thus, for example, the seizure of multiplex highways M1 by scanning samples during the 5th and 25th time slots is shown on time line *m*1. However, the seizure of the multiplex highways which act to transmit the samples retrieved from the registers to the multiplex highway Z12, and the seizure of the multiplex highways which convey the scanning samples received from the highway Z12 to the next register, are not shown. As has already been mentoined, these seizure operations can be carried out over any multiplex highways in which these particular time slots are available. Of course, the scanning samples pertaining to the same message channel can also be taken from or conveyed to the registers over different multiplex highways.

The application of the method of the invention will now be described for the case in which the message channels connect subscriber stations which are associated with the same multiplex highway. This method is particularly suitable if only one of the scanning switches associated with that highway is actuatable during the same time slot. This will be the case if only one delay line storage device is provided for each multiplex highway, as has already been described. This case is similar to the one which has already been described in connection with FIG. 1 in which two subscriber stations to be connected are associated with two different multiplex highways of one group. The temporary registration of the scanning samples also takes place in the same manner as previously described, but the scanning samples are not conveyed to the second multiplex highway after the temporary registration, but are conveyed again to the same multiplex highway from which they are conveyed to the other subscriber station associated with this multiplex highway. Therefore, two groups of time slots are necessary for this multiplex highway, for example, four time slots. This is independent of the manner in which further multiplex highways are connectable to this particular multiplex rail, so that this is also applicable in the circuit apparatus of FIGS. 2 and 3. In this case also one of the intermediate registers serves to register a scanning sample between two successive actuations of the different scanning switches to be operated for completion of the connection.

As has already been mentioned several times, equally spaced time slots are required for the transmission of scanning samples on the multiplex highways to which the subscriber stations supplying or receiving the wide band messages are connected. Accordingly, in one form of the method of the invention, time slots are kept idle or available for transmission of equally spaced scanning samples, in order to avoid blockages, or the impossibility of completing a connection. The number of equally spaced time slots to be kept available depends upon the ratio of the normal requirement for channels of multiplied bandwidth to the normal requirements for channels of single bandwidth. Generally the number of time slots which must be maintained available is therefore not very large. As a consequence, no considerable traffic limitations result for message channels of single bandwidth.

In another form of the method of the invention, all time slots are available for message channels of single bandwidth, but in order to avoid blocking of message channels of multiple bandwidth, time slot shifting operations are carried out when necessary, in order to make available time slots for transmission of equally spaced scanning samples. In this case no limitation on traffic occurs for message channels of single bandwidth. These shifting operations are carried out by the central control mechanism associated with the exchange apparatus, which central control mechanism carries out all of the exchange procedures necessary to establish and to discontinue connections, in known fashion.

The use of several scaning switches to multiply the bandwidth of message channels was described in connection with FIG. 1. That is, the use of a plurality of switches associated with each data subscriber station and actuated at different times within a single scanning cycle, has been described. The actuation of these switches is caused to occur at equally spaced time slots. Consequently, the scanning samples associated with wide band messages are conveyed onward to the receiving station in similar fashion. According to one form of the invention it is also possible to withdraw the scanning samples of the wideband messages by operation of only a single scanning switch which is necessarily actuated several times in equally spaced time slots within a single basic scanning cycle provided for channels of single bandwidth. In this case instead of the two switches S111 and S112 of FIG. 1, a single switch would be employed. Similarly, a single switch can be employed in place of the switches S211 and S212 associated with the receiving station D21. In this case of course the same switching address will be stored in the circulating storage device during a plurality of time slots of a single scanning cycle.

If several switches are provided for each subscriber station which supplies or receives wide band messages, a special address for each of these switches is required. However, in accordance with a further embodiment of the invention, a joint switching address can be supplied for the actuation of the several switches assigned to a particular subscriber station and utilized to form a channel of multiplied bandwidth. That is, with the aid of a distributor, a joint switching address may be used to control actuation of switches associated with the same station in equally spaced fashion. For this purpose, meters assigned to the individual subscriber stations are particularly useful as distributors. In such case the joint address is conveyed during each scanning cycle in a number of slots corresponding to the number of switches, and the meter counts cyclically and actuates the individual switches successively in accordance with the meter reading, over a particular outlet assigned to each meter reading.

It will be evident that many other changes could be made in the method and apparatus of the invention without departure from the scope thereof. Accordingly, the invention is not to be considered limited to the particular embodiments herein described, but rather only by the scope of the appended claims.

I claim:

1. A method for multiplication of the bandwidth of message channels in a plural path segment time multiplex exchange system, including the step of taking a plurality of equally time-spaced scanning samples from a wide band message to be transmitted during a cycle of scanning samples taken from a narrow bandwidth message, wherein the improvement comprises:

temporarily registering, in a corresponding plurality of intermediate registers (C1, C2 . . . C$k$) assigned to a connection, scanning samples taken from message channels of multiplied bandwidth until time slots are available for conveyance of the samples to the next path segment, such registration being until samples from the same message channel can be conveyed in equally time-spaced fashion to the last path segment of the exchange system, and conveying such samples to the last path segment from said plurality of registers, in equally time-spaced fashion.

2. The method of claim 1 in which the exchange system includes at least three path segments, including the step of connecting stations at opposite ends of a single message channel to respective path segments in equally time-spaced time slots, but also completing the channel in the intermediate path segment in unequally time-spaced time slots.

3. Apparatus for multiplication of the band width of message channels in a plural path segment time multiplex communication system, including means for taking a plurality of equally time-spaced scanning samples from a source of a wideband message to be transmitted, during a single cycle of scanning samples taken from a narrow band message, to establish multiplied band width channels connecting together subscriber stations respectively connected to different multiplex highways, wherein the improvement comprises:

at least one additional multiplex highway, a plurality of intermediate registers connectible to said additional highway for receiving and storing scanning samples of message respectively supplied by said additional highway to the register in one time slot and transferring such samples to said additional highway in another time slot, switch means each respectively connected to different ones of said intermediate registers for connecting the associated register to said additional highway, and means for cyclically operated a plural number of said switch means corresponding to said plural number of scanning samples, to establish each said multiplied bandwidth channel.

4. Apparatus as defined in claim 3 wherein said multiplex highways to which the subscriber stations are connected are part of a group of multiplex highways and have second switch means (K) for connecting pairs of the highways together, characterized by:

said first-mentioned switch means including one switch (S1*s* . . . S4*s*) for each multiplex highway of said group for connecting when actuated said additional multiplex highway (MS) to its associated group highway and means for connecting said additional multiplex highway to the group highways other than those connected together by said second switch means (K) and for causing each scanning sample to be registered in a single intermediate register.

5. Apparatus as defined in claim 3, wherein said multiplex highways to which the subscriber stations are connected are arranged in groups and the multiplex highways of different groups are connectable together through at least one multiplex highway (Z12, Z13 . . . Z23) which operate as an intermediate line, characterized by: there being one of said additional multiplex highways (MS1 . . . MS2) for each said group of multiplex highways and a different set of said intermediate registers (CK1, CK2) for each additional multiplex highway, and means for actuating said switch means to store in a single intermediate register scanning samples from connected subscriber stations associated with the same group of multiplex highways and to store selectively in at least one of the intermediate registers associated with the groups being connected scanning samples from connected subscriber stations associated with multiplex highways of different groups.

6. Apparatus as defined in claim 5, including third switch means (S111 . . . S1*p*1, S112 . . . S1*p*2) for connecting together subscriber stations associated with the same multiplex highway (D11 and D1*p*, or D21 and D2*p*) by operation of switches of said third switch means associated with different subscriber stations in different time slots, one of said intermediate registers (C1 . . . C2 . . . C*k*) being operable to store scanning samples between said different time slots.

7. The apparatus of claim 6 in which said third switch means includes a plurality of parallel-connected switches for each wide band subscriber station each operable to connect the station to the associated multiplex highway when actuated, and means (U1, U2) for actuating the switches of said plurality of switches at equally time-spaced intervals.

8. The apparatus of claim 3 including second switch means for connecting the subscriber stations to their associated multiplex highways.

9. The apparatus of claim 8 in which said second switch means includes a plurality of parallel-connected switches for each wide band subscriber station each for connecting the station to the associated multiplex highway when actuated, and means (U1, U2) for actuating the switches of said plurality of switches at equally time-spaced intervals.

10. The apparatus of claim 8 in which said second switch means includes a different switch set between each subscriber station and the associated multiplex highway for connecting when actuated station and highway together, the switch sets between telephone subscriber stations and the highway being actuable at single frequency and the switch sets between data subscriber stations and the highway being actuable at a multiple of said single frequency.

References Cited

UNITED STATES PATENTS

| | | | |
|---|---|---|---|
| 3,280,265 | 10/1966 | Von Sanden et al. | 179—15 |
| 3,217,106 | 11/1965 | Muroga | 179—15 |
| 3,221,102 | 11/1965 | Merz | 179—15 |
| 3,281,537 | 10/1966 | Dupieux | 179—15 |
| 2,564,419 | 8/1951 | Bown | 179—15 |

FOREIGN PATENTS

| | | |
|---|---|---|
| 822,297 | 5/1957 | Great Britain. |

KATHLEEN H. CLAFFY, Primary Examiner

A. B. KIMBALL, Jr., Assistant Examiner